United States Patent
Kim et al.

(10) Patent No.: US 9,153,799 B2
(45) Date of Patent: Oct. 6, 2015

(54) BATTERY MODULE FOR VEHICLE'S BATTERY PACK

(71) Applicant: LG CHEM, LTD., Seoul (KR)

(72) Inventors: Sung-Jong Kim, Daejeon (KR); Chae-Yang Cho, Daejeon (KR); Soon-Ho Ahn, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 14/548,036

(22) Filed: Nov. 19, 2014

(65) Prior Publication Data

US 2015/0072217 A1    Mar. 12, 2015

Related U.S. Application Data

(63) Continuation of application No. PCT/KR2014/003564, filed on Apr. 23, 2014.

(30) Foreign Application Priority Data

Apr. 29, 2013 (KR) .................. 10-2013-0047475
May 31, 2013 (KR) .................. 10-2013-0063088

(51) Int. Cl.
*H01M 2/10* (2006.01)
*H01M 2/02* (2006.01)
(Continued)

(52) U.S. Cl.
CPC .......... *H01M 2/0247* (2013.01); *H01M 2/1077* (2013.01); *H01M 2/206* (2013.01); *H01M 10/5034* (2013.01); *H01M 2220/20* (2013.01)

(58) Field of Classification Search
CPC ............ H01M 2/0245; H01M 2/0247; H01M 2/0262; H01M 2/1005; H01M 2/1016; H01M 2/1077; H01M 2/206; H01M 2220/20; H01M 10/052; H01M 2/105; H01M 2/1055
See application file for complete search history.

(56) References Cited

U.S. PATENT DOCUMENTS

| | | | |
|---|---|---|---|
| 2009/0214940 A1 | 8/2009 | Haussmann | |
| 2010/0047676 A1* | 2/2010 | Park et al. | 429/93 |
| 2010/0255355 A1* | 10/2010 | Park et al. | 429/91 |

FOREIGN PATENT DOCUMENTS

| | | |
|---|---|---|
| EP | 2 290 731 A1 | 3/2011 |
| JP | 2009-193961 A | 8/2009 |

(Continued)

OTHER PUBLICATIONS

International Search Report issued in PCT/KR2014/003564, mailed on Jul. 28, 2014.

(Continued)

*Primary Examiner* — Basia Ridley
*Assistant Examiner* — Heng Chan
(74) *Attorney, Agent, or Firm* — Birch, Stewart, Kolasch & Birch, LLP

(57) ABSTRACT

Disclosed is a battery module, which includes a plurality of cylindrical secondary battery cells (hereinafter, also referred to as 'cells'), an upper frame having a plurality of grooves formed corresponding to an appearance of the cells, the grooves being opened to expose electrodes of the cells outwards, and a lower frame having a plurality of grooves formed corresponding to the appearance of the cells, the grooves being opened to expose electrodes of the cells outwards, wherein cell stoppers are formed at tops of the grooves formed in the upper frame and bottoms of the grooves formed in the lower frame to partially cover the tops and the bottoms of the cells so that the cells are not separated from the grooves. Therefore, it is possible to provide a battery module which may ensure mechanically stable connection when configuring an assembly including a plurality of battery modules.

16 Claims, 4 Drawing Sheets

(51) Int. Cl.
 *H01M 2/20* (2006.01)
 *H01M 10/65* (2014.01)

(56) References Cited

FOREIGN PATENT DOCUMENTS

| JP | 2011-49011 A | 3/2011 |
| KR | 10-2008-0054097 A | 6/2008 |
| KR | 10-2013-0001352 A | 1/2013 |

OTHER PUBLICATIONS

PCT/ISA/237—Issued in PCT/KR2014/003564, mailed on Jul. 28, 2014.

\* cited by examiner

BATTERY MODULE FOR VEHICLE'S BATTERY PACK

CROSS-REFERENCE TO RELATED APPLICATION

The present application is a continuation of International Application No. PCT/KR2014/003564 filed on Apr. 23, 2014, which claims priority to Korean Patent Application No. 10-2013-0047475 filed on Apr. 29, 2013 and Korean Patent Application No. 10-2013-0063088 filed on May 31, 2013 in the Republic of Korea, the disclosures of which are incorporated herein by reference.

BACKGROUND OF THE DISCLOSURE

1. Field of the Disclosure

The present disclosure relates to a battery module, and more particularly, to a battery module for a vehicle's battery pack.

2. Description of the Related Art

A secondary battery having good application to various product groups and good electric characteristics such as high energy density is widely applied to not only portable devices but also an electric vehicle (EV) or a hybrid electric vehicle (HEV) driven by an electric driving source. The secondary battery has a primary advantage of greatly reducing the use of fossil fuels and a secondary advantage of generating no byproduct in use of energy, and thus attracts attention as a new energy source for enhancing environment-friendly and energy-efficient properties.

Lithium ion batteries, lithium polymer batteries, nickel cadmium batteries, nickel hydrogen batteries, nickel zinc batteries or the like are widely used as secondary batteries at the present. Such a unit secondary battery cell has an operating voltage of about 2.5V to 4.2V. Therefore, if a higher output voltage is demanded, a plurality of secondary battery cells may be connected in series to configure a battery pack. In addition, according to a charge/discharge capacity demanded to the battery pack, a plurality of secondary battery cells may also be connected in parallel to configure a battery pack. Therefore, the number of secondary battery cells included in the battery pack may be various set depending on a demanded output voltage or charge/discharge capacity.

Meanwhile, if a plurality of secondary battery cells is connected in series or in parallel to configure a battery pack, the secondary battery cells included in the battery pack should be firmly connected electrically and mechanically. Therefore, a stable and economic design is required for a battery module and a battery pack in order to ensure firm connection of secondary battery cells.

SUMMARY OF THE DISCLOSURE

The present disclosure is designed to solve the problems of the related art, and therefore the present disclosure is directed to providing a battery module for a vehicle's battery pack.

In one aspect of the present disclosure, there is provided a battery module, which includes a plurality of cylindrical secondary battery cells (hereinafter, also referred to as 'cells'); an upper frame having a plurality of grooves formed corresponding to an appearance of the cells, the grooves being opened to expose electrodes of the cells outwards; and a lower frame having a plurality of grooves formed corresponding to the appearance of the cells, the grooves being opened to expose electrodes of the cells outwards, wherein cell stoppers are formed at tops of the grooves formed in the upper frame and bottoms of the grooves formed in the lower frame to partially cover the tops and the bottoms of the cells so that the cells are not separated from the grooves.

According to an embodiment of the present disclosure, the cells may be arranged in three rows. At this time, the cells may be arranged in ten columns.

According to an embodiment of the present disclosure, the cells may be arranged so that three-row arrangements and two-row arrangements are repeated.

According to an embodiment of the present disclosure, threads may be formed at corresponding locations of the upper frame and the lower frame, and the upper frame and the lower frame may be coupled using a screw by means of the threads.

According to an embodiment of the present disclosure, the cell stopper may be located in a space between the arranged grooves and has a rectangular shape.

According to an embodiment of the present disclosure, the grooves respectively formed in the upper frame and the lower frame may be arranged at intervals of 2 mm to 10 mm.

According to an embodiment of the present disclosure, a protrusion may be formed on a top portion of the upper frame, and an indent portion having a shape and location corresponding to the protrusion may be formed in a bottom portion of the lower frame.

According to an embodiment of the present disclosure, a protrusion may be formed on the cell stopper provided at the upper frame, and an indent portion having a shape corresponding to the protrusion may be formed in the cell stopper provided at the lower frame.

According to an embodiment of the present disclosure, a connection unit may be formed at one side of the upper frame or the lower frame for a connection with another battery module. At this time, the connection unit may have a 'ㄱ' or 'ㄴ' shape.

According to an embodiment of the present disclosure, a thread may be formed at one side of the upper frame or the lower frame for the connection with an inner case.

According to an embodiment of the present disclosure, the upper frame and the lower frame may have different colors.

According to an embodiment of the present disclosure, the upper frame and the lower frame may be made of polymer material. At this time, the polymer material may be polycarbonate, an acrylonitrile-butadiene-styrene resin, or a mixture of polycarbonate (PC) and acrylonitrile-butadiene-styrene resin (ABS), which does not contain a halogen element.

In an aspect of the present disclosure, it is possible to provide a stable and economic battery module including a plurality of secondary battery cells.

In another aspect of the present disclosure, it is possible to provide a battery module which may ensure mechanically stable connection when configuring an assembly having a plurality of battery modules.

BRIEF DESCRIPTION OF THE DRAWINGS

The accompanying drawings illustrate preferred embodiments of the present disclosure and, together with the foregoing disclosure, serve to provide further understanding of the technical spirit of the present disclosure. However, the present disclosure is not to be construed as being limited to the drawings. In the drawings.

DESCRIPTION OF THE PREFERRED EMBODIMENT

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the spirit and scope of the disclosure.

Figure 1:
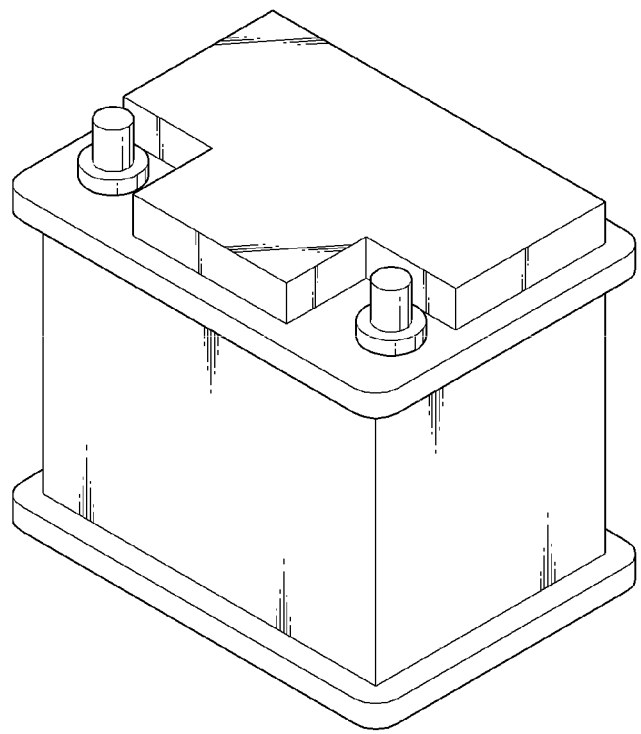
FIG. 1 is a perspective view showing a battery pack including battery modules according to an embodiment of the present disclosure.

FIG. 1 is a perspective view showing a battery pack 1 including battery modules 60 according to an embodiment of the present disclosure.

The battery pack 1 depicted in FIG. 1 is a vehicle's battery pack 1 which may be mounted to a vehicle, a hybrid electric vehicle (HEV), an electric vehicle (EV) or the like.

Preferably, the battery pack 1 may have a size according to the standards for vehicle's batteries. Therefore, the battery pack 1 may have a hexagonal shape as a whole.

Also preferably, the battery module 60 may also have a size according to the standards for vehicle's batteries. However, the battery pack 1 and the battery module 60 are not limited to the above sizes, and their lengths, widths and heights may be set in various ways.

Figure 2:
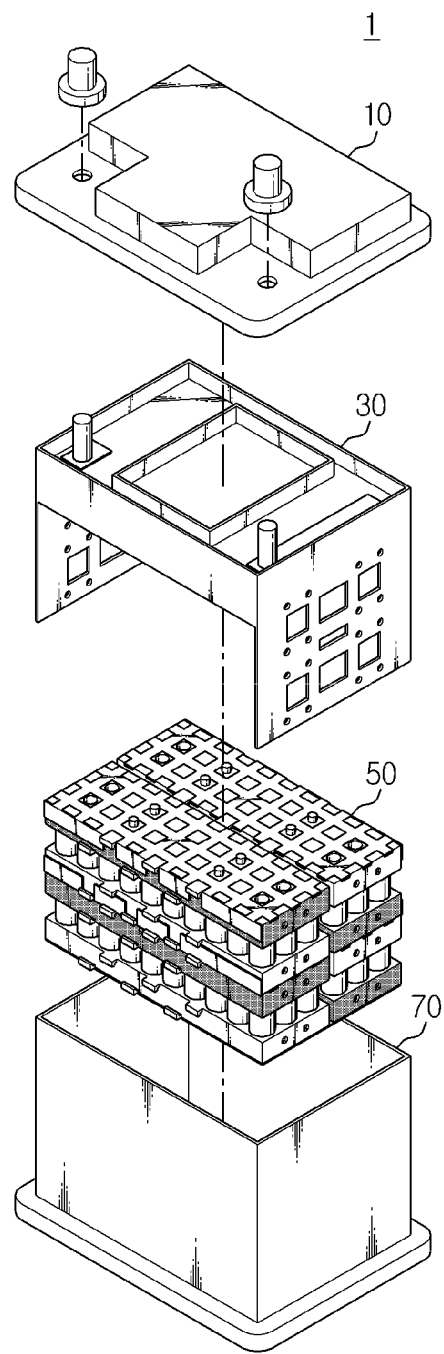
FIG. 2 is an exploded perspective view showing a battery pack including battery modules according to an embodiment of the present disclosure.

FIG. 2 is an exploded perspective view showing a battery pack 1 including battery modules 60 according to an embodiment of the present disclosure.

The battery pack 1 according to an embodiment of the present disclosure may have an operating voltage of 12V when being used for a vehicle. In addition, a secondary battery cell 62 according to an embodiment of the present disclosure may have an operating voltage of 3V. Therefore, four battery modules 60 may be connected in series to configure a battery module assembly 50.

In addition, the battery module assembly 50 and an inner case 30 are included between an upper pack case 10 and a lower pack case 70 to configure the battery pack 1.

Hereinafter, the battery module 60 included in the battery pack 1 will be described.

Figure 3:
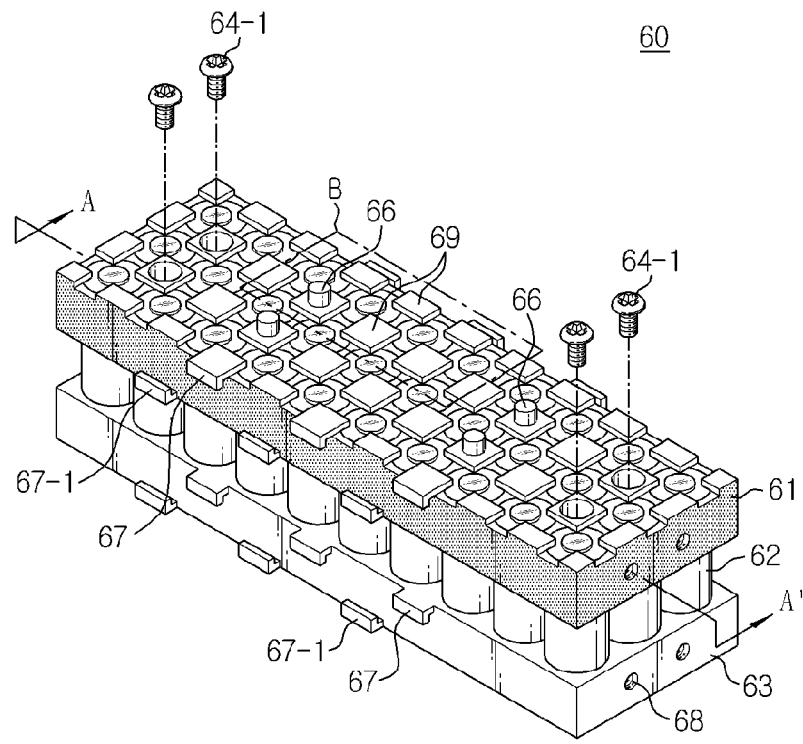
FIG. 3 is a perspective view showing a battery module according to an embodiment of the present disclosure.

FIG. 3 is a perspective view showing a battery module 60 according to an embodiment of the present disclosure.

Referring to FIG. 3, the battery module 60 according to an embodiment of the present disclosure includes an upper frame 61, a plurality of cylindrical secondary battery cells 62 (hereinafter, also referred to as 'cells') and a lower frame 63.

The cells 62 are not specially limited in their kinds. Each cell 62 may be a lithium ion battery, a lithium polymer battery, a nickel cadmium battery, a nickel hydrogen battery, a nickel zinc battery or the like, which are rechargeable and should consider a charge or discharge voltage.

The number of cells included in the battery module 60 may be set in various ways.

According to an embodiment of the present disclosure, the cells 62 are arranged in three rows. In addition, the cells 62 may also be arranged in ten columns. In the embodiment depicted in FIG. 3, the battery module 60 includes thirty cells 62, which are arranged in three rows and ten columns.

Figure 4:
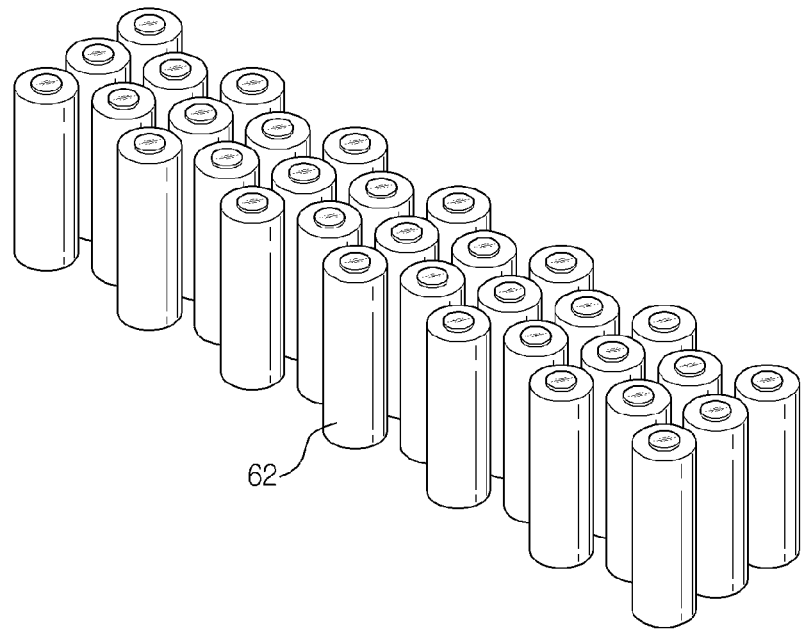
FIG. 4 is a diagram showing an arrangement of cells according to another embodiment of the present disclosure.

FIG. 4 is a diagram showing an arrangement of the cells 62 according to another embodiment of the present disclosure. According to another embodiment of the present disclosure, the cells 62 are arranged so that three-row arrangements and two-row arranges are repeated. In other words, as shown in FIG. 4, the cells 62 are arranged to repeat three-row arrangements and two-row arranges. FIG. 4 shows only the arrangement of the cells 62, and the upper frame 61 and the lower frame 63 are not depicted for better understanding. When arranging cylindrical cells, in order to minimize the space occupied by the cells 62, the cells 62 may also be arranged as depicted in FIG. 4.

Meanwhile, the arrangements of the cells 62 depicted in FIGS. 3 and 4 are just examples. However, for convenience, the arrangement of the cells 62 will be described based on the embodiment depicted in FIG. 3.

Referring to FIG. 3 again, the battery module 60 according to an embodiment of the present disclosure is configured so that a plurality of cells 62 is interposed between the upper frame 61 and the lower frame 63. In other words, the upper frame 61 and the lower frame 63 define spaces where the plurality of cells 62 is arranged. In addition, the upper frame 61 and the lower frame 63 play a role of holding the arranged cells 62 to be mechanically fixed.

Figure 5:
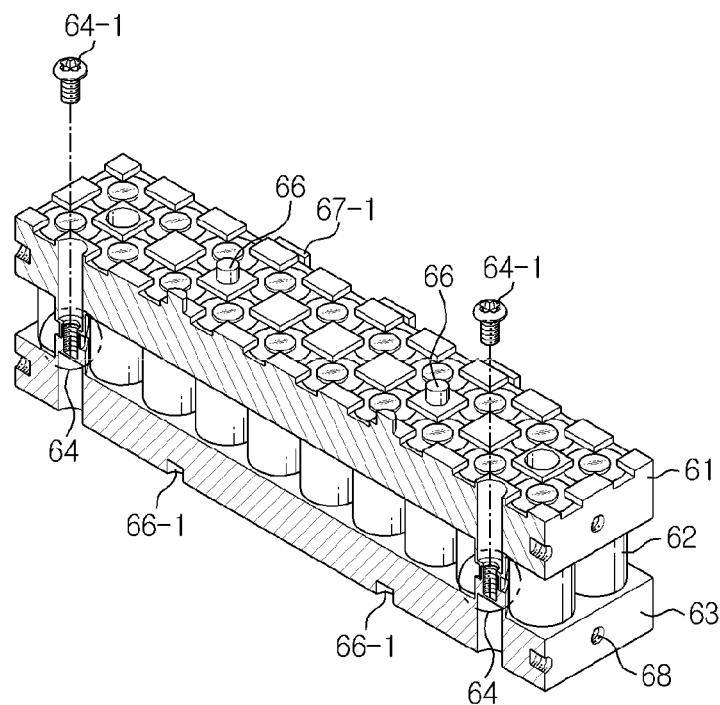
FIG. 5 is a cross-sectional view showing the battery module, taken along the line A-A' of FIG. 3.

FIG. 5 is a cross-sectional view showing the battery module 60, taken along the line A-A' of FIG. 3.

According to an embodiment of the present disclosure, threads 64 are formed at corresponding locations of the upper frame 61 and the lower frame 63. By means of the threads 64, the upper frame 61 and the lower frame 63 may be coupled using screws 64-1. The number and location of the threads 64 and the screws 64-1 may be set in various ways.

Figure 6:
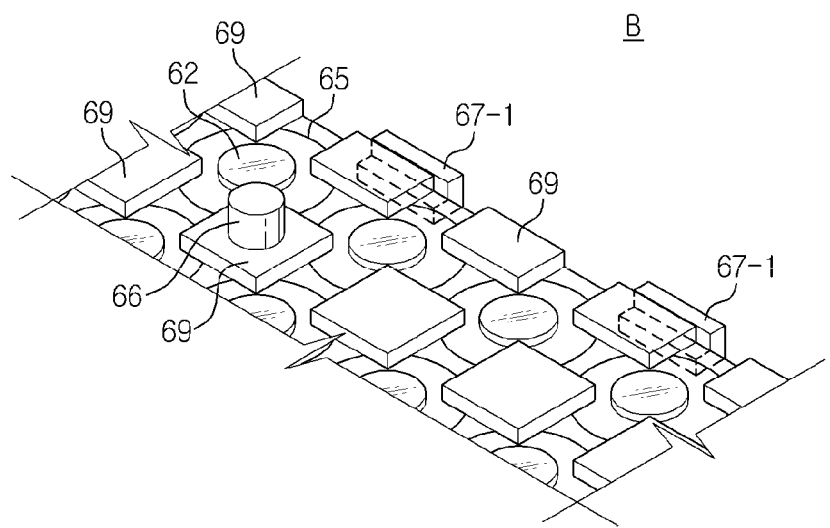
FIG. 6 is an enlarged view showing the portion B of the battery module depicted in FIG. 3.

FIG. 6 is an enlarged view showing the portion B of the battery module 60 depicted in FIG. 3.

A plurality of grooves 65 corresponding to an appearance of the cells 62 is formed in the upper frame 61. In addition, tops of the grooves 65 are opened to expose electrodes of the cells 62 outwards. Moreover, cell stoppers 69 are formed at the top of the grooves 65 provided at the upper frame 61. The cell stoppers 69 partially covers the tops of the cells 62 so that the cells 62 are not separated from the grooves 65, and the cell stoppers 69 also prevents vertical vibration of the cells 62.

A plurality of grooves 65 corresponding to the appearance of the cells 62 is also formed in the lower frame 63. In addition, the grooves 65 also have open bottoms so that electrodes of the cells 62 are exposed outwards. In addition, cell stoppers (not shown) are formed at the bottoms of the grooves 65 provided at the lower frame 63 to partially covers the bottoms of the cells 62 so that the cells 62 are not separated from the grooves 65. Even though the cell stoppers formed at the lower frame 63 are not shown in the figure, they are substantially identical to the cell stoppers 69 formed at the upper frame 61.

According to an embodiment of the present disclosure, the cell stopper 69 is located in the space between the arranged grooves 65. A size and shape of the cell stopper 69 may be set to partially cover the cells 62 without covering the electrodes of the cells 62. Even though the cell stopper 69 according to an embodiment of the present disclosure is shown as having a rectangular shape, the shape and size of the cell stopper 69 may be modified in various ways.

According to an embodiment of the present disclosure, the grooves 65 respectively formed in the upper frame 61 and the lower frame 63 are arranged at intervals of 2 mm to 10 mm. Since the grooves 65 are formed at intervals, it is possible to minimize that heat generated when charging or discharging any cell 62 is transferred to another adjacent cell 62. Preferably, the grooves 65 may be arranged at intervals of 4 mm.

Referring to FIG. 5 again, a protrusion 66 is formed on a top portion of the upper frame 61 according to an embodiment of the present disclosure. In addition, an indent portion 66-1 having a shape and location corresponding to the protrusion 66 is formed in a bottom portion of the lower frame 63.

As described above, in the battery pack 1 according to an embodiment of the present disclosure, four battery modules 60 configure the battery module assembly 50 (see FIG. 2). At this time, when the battery modules 60 are stacked vertically, the protrusion 66 and the indent portion 66-1 may fix an upper battery module and a lower battery module. If the battery modules 60 are stacked using the protrusion 66 and the indent portion 66-1, the battery modules may be easily stacked, and it is possible to prevent an upper battery module 60 and a lower battery module 60 from deviating from their proper locations.

According to an embodiment of the present disclosure, the protrusion 66 is formed on the cell stopper 69 provided at the upper frame 61. In this case, the indent portion 66-1 is formed in the cell stopper provided at the lower frame 63 to have a shape corresponding to the protrusion 66. FIGS. 3, 5 and 6 show an embodiment in which the protrusion 66 is formed on the cell stopper 69. Meanwhile, a location, shape and size of the protrusion 66 may be modified in various ways, and the indent portion 66-1 has a location, shape and size corresponding to the protrusion 66.

According to an embodiment of the present disclosure, connection units 67, 67-1 are formed at one side of the upper frame 61 or the lower frame 63 for a connection to another battery module.

Referring to FIGS. 3 and 6, the connection units 67, 67-1 formed at the sides of the upper frame 61 and the lower frame 63 are depicted. As described above, in the battery pack 1 according to the present disclosure, four battery modules 60 configure the battery module assembly 50 (see FIG. 2). At this time, the battery module 60 may be mechanically coupled to another battery module 60 adjacent to a side thereof by means of the connection units 67, 67-1.

According to an embodiment of the present disclosure, the connection units 67, 67-1 have 'ㄱ' or 'ㄴ' shape. The connection unit 67 having a 'ㄱ' shape and the connection unit 67-1 having a 'ㄴ' shape may be connected to each other to prevent the battery module 60 from being deviated in a horizontal direction. For this, when configuring the battery module assembly 50 battery modules 60 adjacent to each other may be arranged so that the connection unit 67 having a 'ㄱ' shape and the connection unit 67-1 having a 'ㄴ' shape are connected to each other.

According to an embodiment of the present disclosure, a thread 68 is formed at one side of the upper frame 61 or the lower frame 63 for a connection to the inner case 30. As described above, in the battery pack 1 according to an embodiment of the present disclosure, four battery modules 60 configure the battery module assembly 50 (see FIG. 2). In addition, the battery module assembly 50 is connected to the inner case 30. Therefore, the battery module assembly 50 may be connected to the inner case 30 using a screw by means of the thread 68 formed at one side of the upper frame 61 or the lower frame 63.

According to an embodiment of the present disclosure, the upper frame 61 and the lower frame 63 have different colors. If the upper frame 61 and the lower frame 63 have different colors, it is possible to prevent properties of the electrodes of the cells 62 included in the battery module 60 according to the present disclosure from being confused.

The upper frame 61 and the lower frame 63 according to the present disclosure may be made of polymer material.

Selectively, the polymer material is polycarbonate.

Also selectively, the polymer material is an acrylonitrile-butadiene-styrene resin.

In another embodiment of the present disclosure, the polymer material is a mixture of polycarbonate (PC) and acrylonitrile-butadiene-styrene resin (ABS) and does not contain a halogen element.

In an aspect of the present disclosure, it is possible to provide a stable and economic battery module including a plurality of secondary battery cells.

In another aspect of the present disclosure, it is possible to provide a battery module which may ensure mechanically stable connection when configuring an assembly having a plurality of battery modules.

The present disclosure has been described in detail. However, it should be understood that the detailed description and specific examples, while indicating preferred embodiments of the disclosure, are given by way of illustration only, since various changes and modifications within the spirit and scope of the disclosure will become apparent to those skilled in the art from this detailed description.

What is claimed is:

1. A battery module, comprising:
 a plurality of cylindrical secondary battery cells (hereinafter, also referred to as 'cells');
 an upper frame having a plurality of grooves formed corresponding to an appearance of the cells, the grooves being opened to expose electrode terminals of the cells outwards; and
 a lower frame having a plurality of grooves formed corresponding to the appearance of the cells, the grooves being opened to expose electrode terminals of the cells outwards,
 wherein cell stoppers are formed at tops of the grooves formed in the upper frame and bottoms of the grooves formed in the lower frame to partially cover the tops and the bottoms of the cells so that the cells are not separated from the grooves,
 wherein a protrusion is formed on a top portion of the upper frame, and
 wherein an indent portion having a shape and location corresponding to the protrusion is formed in a bottom portion of the lower frame.

2. The battery module according to claim 1,
 wherein the cells are arranged in three rows.

3. The battery module according to claim 2,
 wherein the cells are arranged in ten columns.

4. The battery module according to claim 1,
 wherein the cells are arranged so that three-row arrangements and two-row arrangements are repeated.

5. The battery module according to claim 1,
 wherein threads are formed at corresponding locations of the upper frame and the lower frame, and the upper frame and the lower frame are coupled using a screw by means of the threads.

6. The battery module according to claim 1,
wherein each of the cell stoppers is located in a space between the arranged grooves and has a rectangular shape.
7. The battery module according to claim 1,
wherein the grooves respectively formed in the upper frame and the lower frame are arranged at intervals of 2 mm to 10 mm.
8. The battery module according to claim 1,
wherein a protrusion is formed on the cell stopper provided at the upper frame, and
wherein an indent portion having a shape corresponding to the protrusion is formed in the cell stopper provided at the lower frame.
9. The battery module according to claim 1,
wherein a connection unit is formed at one side of the upper frame or the lower frame for a connection with another battery module.
10. The battery module according to claim 9,
wherein the connection unit has a 'ㄱ' or 'ㄴ' shape.
11. The battery module according to claim 1,
wherein a thread is formed at one side of the upper frame or the lower frame for the connection with an inner case.
12. The battery module according to claim 1,
wherein the upper frame and the lower frame have different colors.
13. The battery module according to claim 1,
wherein the upper frame and the lower frame are made of polymer material.
14. The battery module according to claim 13,
wherein the polymer material is polycarbonate.
15. The battery module according to claim 13,
wherein the polymer material is an acrylonitrile-butadiene-styrene resin.
16. The battery module according to claim 13,
wherein the polymer material is a mixture of polycarbonate (PC) and acrylonitrile-butadiene-styrene resin (ABS), which does not contain a halogen element.

\* \* \* \* \*